UNITED STATES PATENT OFFICE.

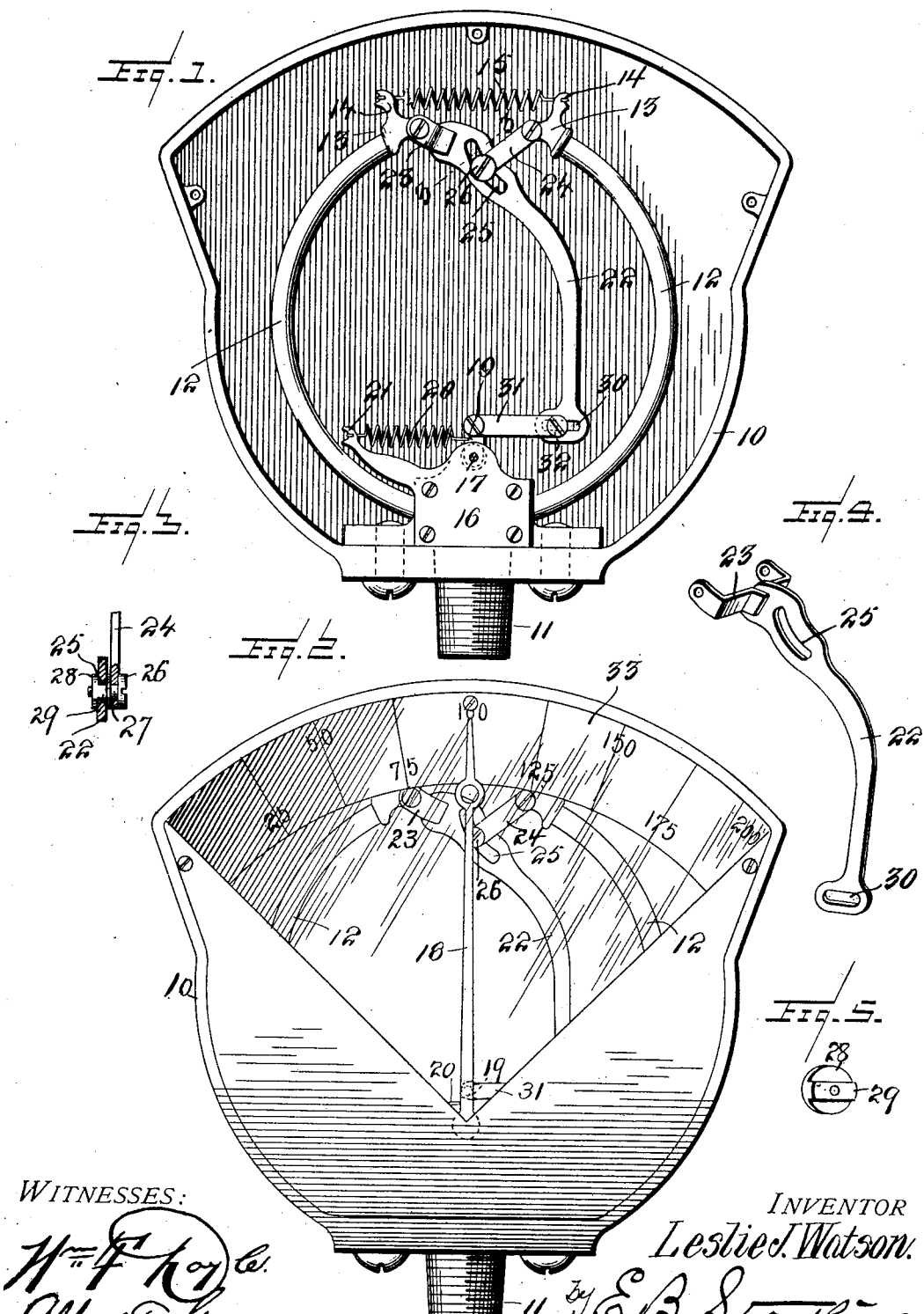

LESLIE J. WATSON, OF UPTON WORKS, MICHIGAN.

PRESSURE-GAGE.

962,107.  Specification of Letters Patent.  Patented June 21, 1910.

Application filed June 11, 1909. Serial No. 501,527.

*To all whom it may concern:*

Be it known that I, LESLIE J. WATSON, citizen of the United States, residing at Upton Works, county of St. Clair, and State of Michigan, have invented certain new and useful Improvements in Pressure-Gages, of which the following is a specification, reference being had therein to the accompanying drawing.

This invention relates to a steam gage and particularly to a structure adapted to obviate the use of any geared connection to the indicating arm thereof.

The invention has for an object to provide a novel and improved structure embodying opposite expansible tubes one of which supports an operating lever connected with the crank arm of an indicator, and the other tube of which is adjustably connected to said arm to regulate the movement thereof.

Other and further objects and advantages of the invention will be hereinafter fully set forth and the novel features thereof defined by the appended claims.

In the drawings:—Figure 1 is an elevation of the invention with the cover removed; Fig. 2 is a similar view with the casing and indicator plate in position; Fig. 3 is a section on line 3—3, Fig. 1; Fig. 4 is a detail perspective of the operating arm. Fig. 5 is a similar view of the clamping nut.

In the drawing, 10 designates the casing of the gage which may be of any desired construction or configuration, and is provided at its lower portion with a steam inlet 11 which communicates with the oppositely curved tubes 12 disposed within the casing. The upper ends of these tubes are provided with heads 13 secured thereto to effect a steam tight closure, and each provided with hooks or extensions 14. Between these hooks a tension spring 15 extends so as to draw these tubes normally toward each other while still permitting their expansion under the temperature and steam pressure. These oppositely disposed curved tubes are mounted at their base in a block 16 and pivoted thereon at 17 is the indicator arm or finger 18 which is provided with a crank portion 19. For the purpose of restoring this arm to its initial position the tension spring 20 extends therefrom to a fixed support 21.

The indicator finger is adapted to be actuated by means of the lever arm 22 which is bifurcated at its upper end 23 to embrace one of the tube ends 12 upon which it is pivoted, as shown in Fig. 1. The opposite tube end is provided with a link 24 pivoted thereon and extending to the lever arm 22 where it is adjustably connected in a curved slot 25 therein. This connection may be of any desired character, for instance as shown in Fig. 3, by means of a bolt 26 extending through the slot 25 and provided with an unthreaded portion next its head upon which the link 24 is pivoted. At the inner side of this link a bearing 27 is secured to the bolt 26, while a clamping nut 28 is mounted upon the threaded end of the bolt 26 and provided with an angular flange 29 adapted to enter the slot 25 and to be held against rotation therein as the screw is adjusted into the nut. This provides a clamping means which permits a free pivoting of the link upon one of the steam tubes while the point of connection is firmly retained by means of the nut mounted on the lever arm 22. The lower end of this arm 22 is provided with a laterally disposed slot 30 in which an operating link 31 is pivotally mounted by a bolt 32 similar in construction to the bolt 26 hereinbefore described.

The upper portion of the casing is provided upon one face with a segmental indicating plate 33 secured thereto in any desired manner and disposed in the path of travel of the upper end of the arm 18 out of alinement with the adjustments for the lever 22 so that this arm and its adjustments are normally visible to the user of the gage. The casing is provided with the ordinary transparent covering plate, as indicated in Fig. 2 which is secured in any desired manner to the casing.

In the operation of the invention it will be seen that the steam within the tubes produces an expansion thereof which places the connecting spring under tension and effects an oscillation of the lever arm. This arm being connected by the link with the crank of the indicating finger at once discloses the pressure of steam placed upon the gage. The adjustable connection from the upper end of the opposite steam tube with this lever arm permits an adjustment to increase or decrease the ratio of movement between the indicating hand and said tubes, while the adjustment at the lower end of the lever arm permits the indicating hand to be set relative to its dial and effects a positive operation of the indicator hand without the necessity of toothed gearing for that purpose. This construction is particularly adapted to overcome the jarring and vibration produced upon the gages when used on traction engines or in locomotive service and similar uses although it is capable of any use desired, as it provides a simple, efficient and economically constructed form of steam gage. The disposition of the dial plate permits free observation of the points of adjustment of the mechanism without removal of any of the parts therefrom so that repairs can be readily effected and the cause of any mechanical disarrangement immediately detected. The restoring spring returns the lever arm to its normal position and prevents any lost motion therein due to loose connections between the parts. The adjustment at the lower end of the lever arm permits the indicating hand to be set to an accurate position before its operation. The invention seeks to provide a mechanism which will withstand the wear caused by constant vibration and a gage of such character that an indicating plate of proper size may be used so that the characters thereon may be clearly visible, and a device which may be conveniently adjusted at any time or place to secure the most accurate and efficient indication of the steam pressure applied thereto. The bifurcated connection between the lever arm and tube prevents any lateral play or wobbling of the former due to the vibration to which the gage is subjected, while the clamp block connection shown provides a convenient slidingly mounted means for adjustment between the lever arm and its connections. The indicating finger or hand is adapted for adjustment so as to avoid the necessity of its removal, and this feature is a material saving both in the manufacture and repair of the gage, as frequently several adjustments are necessary before a proper position of the hand is secured. The provision of the transparent face plate extending upward from the pivot of the indicating finger discloses the entire finger thus enabling the reading of the gage from a greater distance or in a weak light which cannot be reliably done when only the point of the indicating finger is exposed. The spring connecting the tubes adds greatly to the flexibility thereof and renders the indications more accurate at low pressures. The upper portion of the casing is extended to provide for a greater length of dial which renders the reading thereof more easy and legible under all conditions.

Having described my invention and set forth its merits, what I claim and desire to secure by Letters Patent is:—

1. In a pressure gage, opposite tubes, a pivoted indicating finger provided with a crank arm upon its shaft, a slotted lever arm pivoted to the upper end of one of said tubes and extended downward opposite said crank arm, a link extending from the opposite tube and connected to said slot substantially midway between the ends of said tubes, and a horizontally disposed link connection between the lower end of said lever and said crank arm.

2. In a pressure gage, opposite tubes, a pivoted indicating finger provided with a crank arm upon its shaft, a slotted lever arm pivoted to the upper end of one of said tubes and extended downward opposite said crank arm, a link extending from the opposite tube and connected to said slot substantially midway between the ends of said tubes, a horizontally disposed link connection between the lower end of said lever and said crank arm, and a retracting spring extending from said crank arm to a fixed support.

3. In a pressure gage, opposite tubes, a pivoted indicating finger provided with a crank arm upon its shaft, a slotted lever arm pivoted to the upper end of one of said tubes and extended downward opposite said crank arm, a link extending from the opposite tube and connected to said slot substantially midway between the ends of said tubes, a horizontally disposed link connection between the lower end of said lever and said crank arm, a retracting spring extending from said crank arm to a fixed support, and a tension spring extending between the free ends of said tubes.

4. In a pressure gage, opposite tubes, a lever arm pivoted upon one of said tubes and provided with a curved slot at its upper portion and a horizontal slot at its lower portion, a link extending from said curved slot to the opposite tube, a pivoted indicating finger provided with a crank arm, a link carried by said arm and extended to said horizontal slot, a clamping nut having an angular flange slidably mounted in each of said slots, and a bolt threaded into each nut and provided with a pivotal bearing for its connecting link.

5. In a pressure gage, opposite tubes, a lever arm pivoted upon one of said tubes and provided with a curved slot at its upper portion and a horizontal slot disposed at its lower portion, an indicating finger connected at the horizontal slot of said arm, a link connection between said curved slot and opposite tube, and means for holding said link in adjusted position in said curved slot.

6. In a pressure gage, opposite tubes, a lever arm pivoted upon one of said tubes and provided with a curved slot in its upper portion and a horizontal slot disposed at its lower portion, an indicating finger connected at the horizontal slot of said arm, a link connection between said curved slot and opposite tube, and a tension spring connecting the ends of said tubes.

7. In a pressure gage, opposite tubes, a lever arm pivoted upon one of said tubes and provided with a curved slot in its upper portion and a horizontal slot disposed at its lower portion, a link connection between said curved slot and opposite tubes, a tension spring connecting the ends of said tubes, an indicating finger having a crank arm, and an operating link extending therefrom and adjustably mounted in the straight slot of the lever arm.

8. In a pressure gage, opposite tubes, a lever arm pivoted upon one of said tubes and provided with a curved slot in its upper portion and a horizontal slot disposed at its lower portion, a link connection between said curved slot and opposite tube, a tension spring connecting the ends of said tubes, an indicating finger having a crank arm, an operating link extending therefrom and adjustably mounted in the straight slot of the lever arm, and a restoring spring extending from said indicating finger to a fixed point.

9. In a pressure gage, opposite tubes, a lever arm pivoted upon one of said tubes and provided with a curved slot in its upper portion and a horizontal slot disposed at its lower portion, a link connection between said curved slot and opposite tube, a tension spring connecting the ends of said tubes, an indicating finger having a crank arm, an operating link extending therefrom and adjustably mounted in the straight slot of the lever arm, a restoring spring extending from said indicating finger to a fixed point, a casing inclosing said parts, and a segmental indicating dial mounted upon the upper portion of said casing out of alinement with the adjustments of said lever arm.

10. In a pressure gage, a casing, a communicating support at the lower end thereof, opposite tubes mounted in said support, a tension connection between the upper ends of said tubes, a lever pivoted to one of said tubes and provided with a curved slot at its upper portion and a horizontal slot at its lower portion, a link pivoted to the opposite tube and extending to said curved slot, a pivoted indicating finger having a crank arm upon its shaft, and a connection from said crank arm adjustably mounted at the horizontal slot of said arm.

11. In a pressure gage, a casing, a communicating support at the lower end thereof, opposite tubes mounted in said support, a tension connection between the upper ends of said tubes, a lever pivoted to one of said tubes and provided with a curved slot at its upper portion and a horizontal slot at its lower portion, a link pivoted to the opposite tube and extending to said curved slot, a pivoted indicating finger having a crank arm upon its shaft, a connection from said crank arm adjustably mounted at the horizontal slot of said arm, an attaching post carried by said support at the side of the crank arm opposite the lever arm, and a coiled spring extending from said attaching post to said crank arm.

In testimony whereof I affix my signature in presence of two witnesses.

LESLIE J. WATSON.

Witnesses:
  WALTER NORRIS,
  W. S. COON.